April 4, 1967     O. J. ALITZ     3,312,972
TACAN AZIMUTH CALIBRATION TECHNIQUE
Filed Oct. 20, 1965
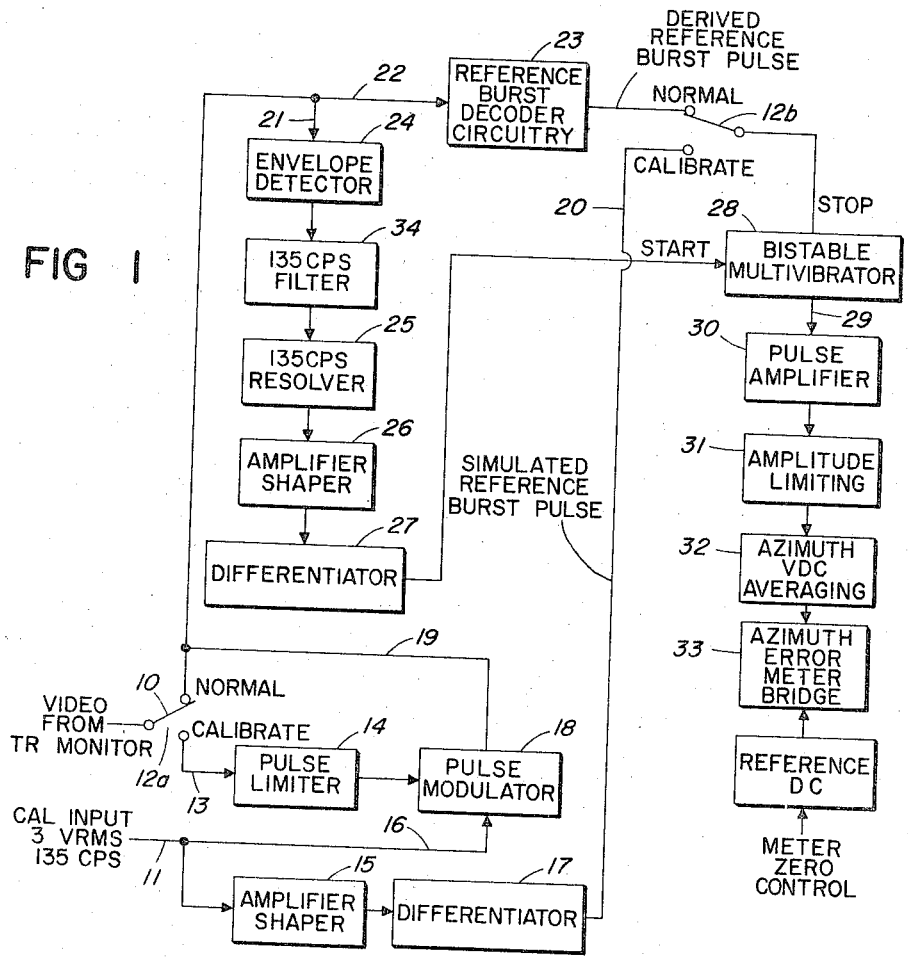
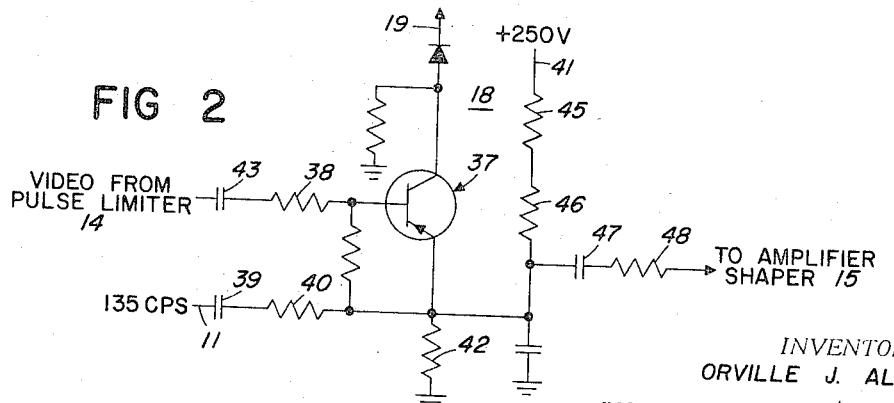
INVENTOR.
ORVILLE J. ALITZ
BY
Moody & Anderson
AGENTS United States Patent Office 3,312,972
Patented Apr. 4, 1967

3,312,972
TACAN AZIMUTH CALIBRATION TECHNIQUE
Orville J. Alitz, Cedar Rapids, Iowa, assignor to Collins Radio Company, Cedar Rapids, Iowa, a corporation of Iowa
Filed Oct. 20, 1965, Ser. No. 498,324
9 Claims. (Cl. 343—106)

A calibration system for a TACAN azimuth monitoring circuitry which, in lieu of employing a completely regenerated TACAN composite video signal consisting of reference bursts, squitter pulses and azimuth indicative pulse amplitude modulation, provides means for removing the amplitude modulation from the incoming composite video signal and remodulating at a reference signal rate. The remodulated pulse train is applied to the monitoring circuitry which normally develops a signal in time correspondence with a particular zero cross-over of the composite video amplitude modulation. A second signal is developed from the reference signal as a simulated reference burst pulse normally demodulated from the composite video input. By utilizing the same reference signal source for development of the amplitude modulation phase indicative pulse and the simulated reference burst pulse, indicating means measuring the time discrepancies in the system may be calibrated with assurance of constant in-phase relationship with variation in temperature and/or time which would affect the normal monitoring circuitry.

This invention relates generally to the calibration monitoring equipment and more particularly to a monitoring and calibration system used in monitoring the azimuth characteristics for the TACAN beacon signal. The TACAN navigation system has been widely treated in the literature. This system provides both distance and bearing information. It provides distance information in a manner similar to radar except that a transponder ground beacon provides amplification of the reflected pulses. Bearing information is obtained in TACAN in a manner somewhat similar to the variable omnirange system. Amplitude modulation is provided on a sequence of pulses which varies sinusoidally and is received by an aircraft with a phase variation that is a function of the aircraft bearing with respect to a bearing reference wave.

In the TACAN system the reference wave is determined by the time appearance and recognition of a burst of pulses called a north reference burst which identifies the system phase representing the direction north. A second amplitude modulation is employed at a rate comprising nine cycles between each cycle of the north reference burst to provide one cycle of amplitude modulation for each 40° of beacon antenna rotation.

The present invention is concerned primarily with the bearing determining aspect of the TACAN navigation system wherein the TACAN receiver develops from the reference burst a phase reference, and, from the envelope of the amplitude modulation of the burst train received, generates a signal in time correspondence with a particular zero cross-over of the modulation envelope. By time comparing the latter signal with the occurrence of the reference pulse, an indication of the bearing of the receiver from the ground station is obtained.

The present invention relates to a monitoring system which is used in determining the correct operation of a TACAN ground transponder and antenna system. Such systems are used to continuously monitor the characteristics of the transmitted beacon signal and generally provide alarm facilities for indicating any faulty operation of the ground transmitting facility.

More particularly the present invention relates to a monitoring system and a means of calibrating the monitor to insure that the monitor, in being used as a reference for correct system operation, is itself free of error. The monitoring and calibration system to be described receives a composite TACAN video signal which consists of regularly spaced reference bursts of pulses, and randomly spaced squitter pulses occurring at an average repetition rate of 7200 pulses per second. A TACAN system includes a rotating antenna pattern to space modulate the pulse signal with 15 and 135-c.p.s. modulation components. The azimuth of any receiver from the antenna is determined by comparing the time position of the reference burst to the time position of the received signal modulation envelope zero phase crossing. The calibration to be described provides an absolute reference used to determine the accuracy with which the modulation envelope of the composite TACAN video signal above described is recovered and processed within the monitor. The calibration technique then provides a means of zeroing the monitoring system on the basis of its reaction to a synthesized calibrating signal.

In the previous TACAN monitoring systems a complete composite video signal consisting of reference bursts, squitter pulses, and the composite modulation was generated by an external calibrator. The external calibrator functions to simulate a TACAN signal as it would be received at the particular radio of interest. The azimuth monitor portion of the system was then adjusted to give the proper response to this input signal. Calibrators used for this purpose, because of the complex nature of the signal which they generate, are necessarily complex; for example, one such calibrator is an external piece of test equipment containing 37 tubes of which 29 are dual purpose.

The calibrator of the present invention contains a minimum of circuitry and operates upon the principle of combining the normally monitored TACAN signal with an external 135-c.p.s. signal source to provide a stable reference. This reference is used to check and correct, if necessary, for variations in stability in the 135-c.p.s. operating circuitry in the monitor which might have occurred because of tube interchange, temperature variation or component ageing.

It is the object therefore of the present invention to provide a "built-in" calibration system for a TACAN azimuth monitor which requires a minimum of components.

It is a further object of the present invention to provide a calibration system for a TACAN azimuth monitoring system in which calibration is simple and direct and accuracy is enhanced.

The present invention is featured in the provision of a calibration technique employing signal synthesizing techniques assuring constant in-phase relationship between critical signal comparisons with variations in time and/or temperature.

These and other features and objects of the present invention will become apparent upon reading the following description in conjunction with the accompanying drawings in which;

FIGURE 1 is a functional block diagram of the azimuth monitoring technique and calibrating system of the present invention;

FIGURE 2 is a schematic diagram of the pulse modulator portion of the azimuth calibrator circuitry employed.

The azimuth monitoring and calibration system is depicted functionally in block diagram of FIGURE 1. The input to the system is in the form of a TACAN video signal 10 comprised of amplitude modulated pulses. The modulation envelope of the pulse train bears a phase relationship depending upon the azimuth of the receiving station with respect to the ground transmitting facility in accordance with that described above. The negative zero-crossing of the modulation envelope is determined as well as the time occurrence of the reference burst pulses which serve as the azimuth reference. The time between the occurrence of the reference burst and the modulation envelope zero crossing is then a measuring of azimuth.

During normal monitoring operations, the composite input video signal 10 is applied through the "normal" position of function switch 12a as input signal to two channels. The video signal is applied through connector 22 to a reference burst decoder circuitry 23 the details of which need not be treated here. It suffices to say that the reference burst decoder circuitry 23 amplifies and shapes the pulses, decodes the north and auxiliary reference burst on the basis of a pulse pair relationship inherent in the TACAN system, and, after a predetermined pulse count in each burst, provides a pulse output to a bistable multivibrator 28 through the "normal" position of the function switch section 12b.

The other path for the composite video signal is that through line 21 to a 135-c.p.s. envelope circuitry comprised of envelope detector 24, 135-c.p.s. resolver 25, an amplifier shaper circuitry 26 and a differentiator 27. The envelope detector 24 effectively looks at the peaks of the train of pulses applied as input and provides an output signal to the resolver 25 which follows the peak of the pulses in the composite signal 21. The envelope detector 24 thus recovers the modulation envelope of the pulse train. The output of the envelope detector 24 is thus a composite signal of both the 135-c.p.s. and 15-c.p.s. components. For the purpose of the present invention only the 135-c.p.s. modulation component is utilized, with the filter 34 removing the 15-c.p.s. component prior to application to the resolver 25. The 135-c.p.s. sine wave from resolver 25 is applied to amplifier shaper 26 the output of which is a square wave having a phase corresponding precisely to that of the resolver output signal. The resolver 25 is adjusted such that the phase shift of the 135-c.p.s. sine wave may correspond to the azimuth setting of any particular TACAN station installation being monitored. The square wave output from amplifier-shaper 26 is applied to differentiator 27 and the positive spike of the differentiated waveform is used to start the bistable multivibrator 28.

It becomes apparent then that the output wave form of the bistable multivibrator exhibits a duty cycle which is a function of the time-difference in the appearance of the reference burst pulse from the burst decoder circuitry and the start pulse from the 135-c.p.s. envelope circuitry. The time occurrence of the reference burst pulse from the burst circuitry 23 is the phase reference and the time occurrence of the start pulse from the 135-c.p.s. envelope circuitry is a function of the particular azimuth involved as set by the resolver 25. The monitoring function is based upon an adjustment of the phase shifts and time delays inherent in the burst pulse circuitry 23 and in the 135-c.p.s. envelope circuitry being relatively adjusted so that, for a zero degree bearing error, the width of the pulse from the bistable multivibrator 28, is a predetermined number of microseconds; for example, 1,000 microseconds. This 1,000 microsecond pulse 29 from multivibrator 28 is amplified in a pulse amplifier 30, limited in an amplitude limiting function 31, and applied to an azimuth D.C. averaging circuitry 32. The averaging circuit 32 provides a D.C. output voltage which is a function of the duration of the output pulse 29 from multivibrator 28. Any error in the bearing information in the composite TACAN signal will thus cause a change in the width of the pulse 29 and therefore a change in the D.C. voltage from averaging circuitry 32. This voltage is applied to an azimuth error bridge circuitry 33 for comparison with a reference D.C. voltage. Any discrepancy between the voltage from averaging circuitry 32 and the reference results in a bridge unbalance which may be monitored by the azimuth error meter.

The accuracy of the monitoring system of course depends upon the stability of the circuitry 23 deriving the reference burst pulse and the circuitry deriving the 135-c.p.s. modulation envelope. Any ageing effect within this circuitry would introduce an inaccuracy in the monitoring function and thus means must be employed to calibrate the azimuth monitoring circuitry. The calibration function might be compared with the calibration of an ohmmeter wherein the meter is "zeroed" prior to its usage and this zeroing must be accomplished prior to each usage in order to maintain accuracy due to the ageing of the ohmmeter battery. The monitoring accuracy of the present invention likewise necessitates calibration of the monitoring circuitry due to changes in component characteristics with temperature change, component interchange and/or component ageing. The calibrate function to be described provides an absolute reference by which the accuracy with which the modulation envelope of the composite video signal is recovered and processed through the complete 135-c.p.s. envelope circuitry (envelope detector 24, filter 34, resolver 25, amplifier shaper 26, and differentiator 27) may be ascertained.

The calibration system to be described provides a means of zeroing the monitor on the basis of the system's reaction to a calibration signal internally generated in the form of a simulated TACAN video signal. A simulated reference burst pulse 20 is generated as a stop pulse for multivibrator 28 and the start pulse is derived by the 135-c.p.s. envelope circuitry as the zero cross-over of a 135-c.p.s. modulation envelope which in this case is established by a reference 135-c.p.s. calibration signal.

With reference to FIGURE 1, the "calibrate" condition is illustrated for each of the function switch sections 12a and 12b. In the "calibrate" position of switch section 12a, the normally monitored TACAN video signal 10 is not applied directly to the monitor but instead is applied as input to a pulse limiter 14 in the azimuth calibrator circuitry. The calibrator receives a second input 11 in the form of the 135-c.p.s. reference sine wave. Output 19 from the calibrator is then applied to the monitor in lieu of the TACAN video signal and output 20 from the calibrator is applied as a stop pulse to bistable multivibrator 28 through the calibrate position of function switch section 12b.

Pulse limiter 14 of the calibrator circuitry receives the TACAN video input signal 10 and develops an output in the form of the input pulse train minus the amplitude modulation. For this purpose, pulse limiter 14 might be comprised of a saturating amplifier to provide an output of negative-going reference burst and squitter pulses of a fixed amplitude. The output from pulse limiter 14 is applied to a pulse modulator 18 along with a second input 16 in the form of the 135-c.p.s. reference sine wave input. Thus the output from pulse modulator 18 comprises the TACAN video pulse train with amplitude modulation at the reference 135-c.p.s. rate. The 135-c.p.s. reference input 11 is additionally applied to an amplifier shaper 15, which produces a square wave for application to a differentiator 17. The output from differentiator 17 includes positive spikes corresponding to the positive slope zero cross-over of the reference 135-c.p.s. input signal. The 135-c.p.s. envelope monitoring circuitry now functions to recover from the output of the pulse modulator 18 the 135-c.p.s. reference modulation and, as in the "normal" operating function, develops output pulses corresponding to the negative slope zero cross-over of this reference 135-c.p.s. envelope as start pulses for multivibrator 28.

The time relationship between the recovered 135-c.p.s. reference modulation envelope of the output 19 of the calibrator and the simulated reference burst output 20 which functions as the stop pulse for multivibrator 28 is highly stable and may be fixed and calibrated to a specific azimuth. The azimuth circuitry may then be checked and set at this azimuth by adjustment of resolver 25 in the 135-c.p.s. envelope circuitry. Any discrepancy due to ageing in the 135-c.p.s. envelope circuitry may be adjusted out in the azimuth error bridge circuitry 33 by means of the meter zero control.

It is noted that the reference burst detector circuitry 23 is not included in the calibration scheme because time delays in this circuitry are relatively fixed. The pulse circuitry employed in the reference burst decoder circuitry 23 is of an on-off type and any possible changes in delay in the pulse circuitry would be very insignificant.

Once the output has been calibrated, the run-out of the 135-c.p.s. envelope circuitry can be checked by measuring the width of the 1,000 microsecond output pulses 29 of the bistable multivibrator 28 for various settings of the resolver 25. Any deviation from a linear relationship between the settings of the resolver 25 and the width of the output pulses 29 from bistable multivibrator 28 becomes run-out error.

The preciseness of the calibration technique described here is due to the modulating technique employed in the azimuth calibrator circuitry. Reference is made to the schematic representation of the pulse modulator circuitry 18 as shown in FIGURE 2. The modulator 18 may be comprised of a transistor 37 with the input of constant amplitude pulses from pulse limiter 14 being applied through a capacitor 43 and resistor 38 to the base of the transistor. The supply voltage 41 for transistor 37 is determined by the voltage divider consisting of resistors 45, 46 and 42. The 135-c.p.s. reference sine wave input 11 is applied through capacitor 39 and resistor 40 across resistor 42 in the voltage divider, such that the supply voltage for transistor 37 is varied at the 135-c.p.s. reference rate. Variation of the supply voltage of the transistor 37 in this manner results in the 135-c.p.s. modulated pulse train output 19 at the collector of the transistor 37. The 135-c.p.s. signal 11 which modulates the pulsed train from transistor 37 is also coupled to amplifier shaper 15 through capacitor 47 and resistor 48 for subsequent development of the multivibrator stop pulse. Due to this modulating technique the time relationship between the pulse modulation (of the signal present at the collector of the transistor 37) and the subsequently differentiated 135-c.p.s. square wave form from amplifier shaper 15 is always fixed within the limit of the generation accuracy of the amplifier shaper 15 and its associated circuitry. The amplifier shaper 15 may be designed to exhibit temperature stability of better than ±0.02 degrees from −10 to +60 degrees centigrade. Thus the calibration technique combines the critical components of the composite signal in such a manner as to insure the accuracy of the calibrating signal within the temperature range of −10 degrees to +60 degrees centigrade and to insure accuracy with component ageing and component replacement.

Utilizing the same 135-c.p.s. reference signal source 11 for both the pulse modulator 18 and the amplifier shaper 15 assures a constant in-phase relationship with variation in time and/or temperature.

The present invention is thus seen to provide a monitoring means for a TACAN video signal by means of which the accuracy of the 135-c.p.s. circuitry may be ascertained and which includes a "built-in" calibration system by means of which the monitor may be precisely calibrated.

The calibration technique is one assuring monitoring accuracy with ageing of the component within the calibrator circuitry and further the calibration system, by comparison to known calibration techniques for TACAN monitoring circuitry, is simple and direct, permitting a vast reduction in component parts and providing increased calibration accuracy.

Although this invention has been described with respect to a particular embodiment thereof it is not to be so limited as changes might be made which fall within the scope of the invention as described in the appended claims.

I claim:

1. In a monitoring system for a composite video signal of the type comprising an amplitude modulated pulse train including periodic reference bursts of pulses whereinformation is conveyed in the form of the variable phase of the amplitude modulation envelope compared to the time occurrence of said reference burst of pulses, said monitoring system comprising first signal processing means for generating a first signal corresponding to the time occurrence of said reference burst of pulses, second signal processing means developing a second signal proportional to a particular zero cross-over of the modulation envelope of said train of pulses, signal comparison means receiving said first and second signals and developing an output signal the amplitude of which is proportional to the time correspondence between said first and second signal; means for calibrating said monitoring system comprising an external source of reference signal at a frequency corresponding to the amplitude modulation component of said composite signal, third signal processing means receiving said composite signal and removing the amplitude modulation therefrom to provide a train of constant amplitude pulses, modulating means receiving said constant amplitude pulses and said reference signal and amplitude modulating said pulses at said reference rate, means applying the output from said modulating means to said second signal processing means, further signal processing means receiving said reference signal and developing therefrom a signal in time correspondence with the zero cross-over thereof, the output of said second signal processing means and said further signal processing means being applied to said signal comparison means.

2. A system as defined in claim 1 further including switching means a first position of which connects said composite video signal to said first and second signal processing means and the output of said first signal processing means to said signal comparison means, a second position of said switching means connecting said composite signal to said third signal processing means and the output of said further signal processing means to said signal comparison means.

3. A system as defined in claim 1 wherein said signal comparison means comprises square wave generating means the duty cycle of which is proportional to the relative time occurrences of said first and second signals, and an indicator receiving the output of said square wave generating means to produce an indication indicative of said duty cycle.

4. A system as defined in claim 3 wherein said indicating means comprises means receiving the output from said square wave generating means and developing therefrom the D.C. average, said indicating means comprising a bridge means the inputs to which are said D.C. average signal and a reference D.C. voltage, and a meter operatively connected in said bridge to indicate the extent of unbalance of said bridge.

5. A system as defined in claim 4 further comprising a zero control means by means of which the amplitude of said reference D.C. voltage may be selectively varied.

6. A system as defined in claim 5 wherein said signal comparison means comprises a bistable multivibrator, said first and second signals corresponding to the reference and variable phase components of said composite video input signal being applied as respective start and stop pulses for said bistable multivibrator, the duty cycle of said bistable multivibrator being a function of the time discrepancy between the occurrence of said first and second signals.

7. A system as defined in claim 6 wherein said modulation means comprises a transistor including collector base and emitter elements, said external reference signal being applied to the emitter base junction of said transistor, and means varying the emitter voltage supply at a rate corresponding to said external reference signal.

8. A system as defined in claim 7 wherein the means for varying the emitter voltage of said transistor comprises a voltage divider network across which a D.C. voltage source is impressed, and means for impressing said source of external reference signal across a portion of said voltage dividing means.

9. In a monitoring system for a composite video signal comprised of a train of pulses the amplitude of which is sinusoidally varied at a variable phase rate and including periodic reference bursts of pulses the time occurrence of which constitutes a phase reference, said monitoring system including first signal processing means for developing a first signal corresponding to a particular zero cross-over of said modulation envelope and second signal processing means for developing a second signal corresponding to the time occurrence of said reference bursts of pulses, and including signal comparison means including indicating means to provide an indication of the discrepancy in time occurrence between said first and second signals; means for calibrating said monitoring system comprising means for removing the amplitude modulation from said composite video signal, means for remodulating the resulting constant amplitude pulse train at a rate determined by an external source of reference signal at a frequency corresponding to that of said modulation envelope, a switching means including a selected position for applying said composite video signal to said means for removing amplitude modulation whereby said remodulated pulse train is applied to said first signal processing means for development of said first signal, further signal processing means receiving said reference signal and determining therefrom a like particular zero cross-over, the latter signal being utilized as said second signal in said signal comparison means, said switching means being adapted in a normal position thereof to apply said composite video signal to said first and second signal processing means in said monitor for the development of said first and second signals as applied to said signal comparison means.

References Cited by the Examiner

UNITED STATES PATENTS

| | | | |
|---|---|---|---|
| 2,912,688 | 10/1959 | Faymoreau et al. | 324—158 X |
| 3,172,107 | 3/1965 | Morris | 343—106 |

FOREIGN PATENTS 736,281   9/1955   Great Britain.

RODNEY D. BENNETT, *Primary Examiner.*

CHESTER L. JUSTUS, *Examiner.*

H. C. WAMSLEY, *Assistant Examiner.*